Aug. 25, 1936. T. MORGAN 2,051,883
SPLASH COVER FOR BEVERAGE MIXERS
Filed Feb. 3, 1936
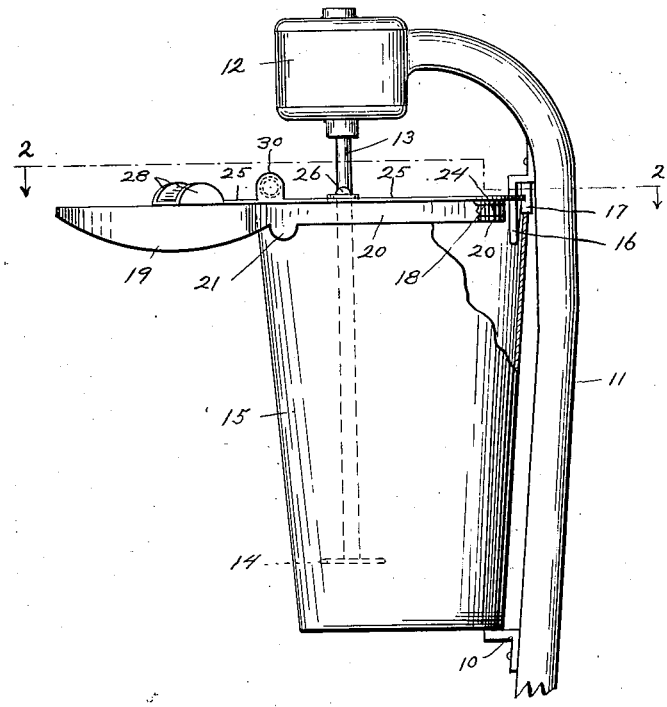
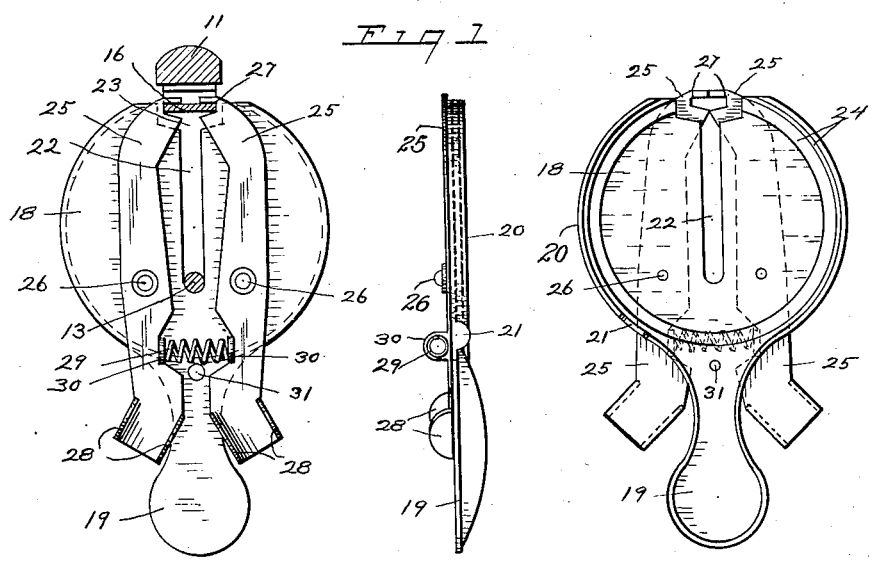
INVENTOR.
Thomas Morgan
BY John J. Thompson
ATTORNEYS.

Patented Aug. 25, 1936

2,051,883

UNITED STATES PATENT OFFICE 2,051,883

SPLASH COVER FOR BEVERAGE MIXERS

Thomas Morgan, La Jolla, Calif.

Application February 3, 1936, Serial No. 62,083

3 Claims. (Cl. 259—125)

This invention relates primarily to beverage mixers of that class which are motor driven and which are employed at bars, soda fountains, and the like, for mixing drinks and other beverages; and the particular object of the invention is to provide a splash cover for the container, in the form of an attachment which may be used with the usual style of mixer now in use.

As these motor driven mixers are operated at a high rate of speed, the mixing spoon which rotates within the liquid container, will, under certain conditions, where it is necessary to mix drinks containing eggs, cream, or fruit syrup, cause the mixture, through centrifugal action, to splash over the side of the container, thus requiring a reduction in the speed and a subsequent loss of time; furthermore, a mixer without a cover for the container requires the constant attention of the operator to prevent the liquid from foaming up within the container and spilling over the sides due to the excessive speed. In many cases where the drink is required in a hurry, it now requires the use of two mixers as the ingredients can not all be mixed at once because of splashing.

To overcome the objections of the usual type of mixers having an open container, I have devised a cover for the container in the form of an attachment which may be quickly placed over the top of the container and which is provided with means for accommodating the beater shaft and also with means for securing it to the standard of the mixer.

The object of the invention is to provide a detachable splash cover for a mixer which will entirely close in the open end of the container and prevent the liquid therein from splashing over the edge.

Another object of the invention is to provide a splash cover having means for firmly and positively retaining the same on the top of the container and so constructed as to provide a minimum amount of noise and vibration.

Another object of the invention is to provide a splash cover so constructed as to seal the top of the container and prevent the contents from foaming over and splashing and thus preventing mussing up the bar.

Another object of the invention is to provide an article of this kind containing few parts, and so designed as to be easily kept clean and sanitary.

A further object of the invention is to provide an article of this class which shall be simple, cheap, durable, efficient, and quickly attached and detached.

With these and other objects in view, my invention consists in certain novel construction and combination of parts as will hereinafter be fully described and claimed, and further illustrated in the accompanying drawing, which forms a part hereof and in which like figures of reference refer to corresponding parts in all of the views, and it is understood that slight changes may be made without departing from the spirit of the invention.

In the drawing:—

Figure 1 is a partial side elevation showing the usual type of mixer, with my device attached thereto.

Figure 2 is a cross sectional view taken on the line 2—2 of Figure 1, and shows the fingers in a gripping relation with the clip and the stand.

Figure 3 shows a bottom view of the device apart from the standard, the fingers being indicated in a normally closed position.

Figure 4 is a side elevation of the same.

Referring to the drawing:—

I have indicated the usual beverage mixer, composed of the standard 11, to the upper end of which is attached the motor 12, having the shaft 13 and beater 14, extending downward within the container 15.

To the standard 11 is attached the clip 16 which embraces the upper edge of the container 15 and within this clip 16 is mounted the motor switch 17 which is operated by placing the edge of the container underneath the clip 16. There is also provided a foot 10 for holding the container 15 in place.

This construction is descriptive of the majority of beverage mixers.

My device comprises a cover 18 of sheet material formed with an integral handle 19 and an annular flanged edge 20 having the two stops 21 for centralizing it on the container; said cover 18 is formed with a slot 22 embracing the motor shaft 13 and with a connecting cut out portion 23 to accommodate the clip 16, the cover 18 being partially lined with a rubber gasket 24 to provide a tight fit and prevent rattle and vibration between the cover and the container 15.

For detachably retaining this cover 18 in place upon the container 15 and attached to the clip 16, I have provided a pair of locking fingers 25 which are pivoted as at 26 to the cover 18 and which are formed upon their inner ends with the notches 27 which are adapted to engage the edges of the clip 16. The outer ends of these fingers 25 are provided with the finger grips 28, and for normally retaining the fingers 25 in an engaged position, there is provided a spring 29 mounted between the ears 30 formed on said fingers 25.

A stop pin 31 is mounted in the cover 18 to limit the action of the fingers 25.

In the use of the device, the outer ends of the fingers 25 are pressed together by the finger grips 28 against the action of the spring 29, which forces apart the notched ends 27 of the fingers 25. The cover 18 is then placed upon the container 15 and the fingers 25 released to grip the clip 16 and hold the cover 18 in place upon both the container 15 and the clip 16, thus completely closing the open end of the container 15 and preventing any splash or foaming over of the contents.

Having thus described my invention, what I claim is new and desire to secure by Letters Patent:—

1. A splash cover for beverage mixer containers, comprising a circular sheet metal cover formed with an integral handle and an annular flange, a gasket mounted within said flange, locating stops formed on said flange to centralize the cover upon the container, said cover formed with an opening adapted to permit the cover to be inserted over the beater shaft of the mixer, a pair of fingers provided upon the said cover and formed at one end with notches adapted to engage with the mixer standard, grips formed on the opposite end of said fingers and a spring for normally retaining said fingers in a locked position.

2. In a detachable splash cover for a beverage mixer, the combination with a beverage mixer having a standard, a beater shaft, a container, and a clip secured to the standard for engaging the upper edge of the container; of a sheet metal cover formed with an annular flange and a projecting handle portion, a gasket mounted within the flange for engaging the upper edge of the container, said cover formed with an opening embracing the beater shaft and the clip, a pair of fingers pivoted upon said cover and formed with notched ends for engaging said clip grips for operating said fingers, and a spring located between said fingers for retaining the same in a locked position upon the clip.

3. In a device of the class described, the combination with a beverage mixer having a beater shaft, a container and a standard, of a cover for said container, locating means on said cover for centering the same with the container, said cover formed with an opening for the beater shaft, and a pair of clamping fingers mounted on said cover and adapted to engage with and detachably retain said cover to the standard.

THOMAS MORGAN.